(12) United States Patent
Weller et al.

(10) Patent No.: US 11,485,519 B2
(45) Date of Patent: Nov. 1, 2022

(54) WING PANEL ASSEMBLY SYSTEM AND METHOD

(71) Applicant: THE BOEING COMPANY, Chicago, IL (US)

(72) Inventors: Dennis Michael Weller, Camano Island, WA (US); Thomas Gee Wittenberg, Arlington, WA (US); Manuel Torres Martinez, Torres de Elorz (ES)

(73) Assignee: THE BOEING COMPANY, Chicago, IL (US)

( * ) Notice: Subject to any disclaimer, the term of this patent is extended or adjusted under 35 U.S.C. 154(b) by 130 days.

(21) Appl. No.: 16/034,008

(22) Filed: Jul. 12, 2018

(65) Prior Publication Data
US 2020/0017238 A1   Jan. 16, 2020

(51) Int. Cl.
*B64F 5/10*      (2017.01)
*B25J 11/00*     (2006.01)
*B64C 3/18*      (2006.01)
*B64C 3/26*      (2006.01)

(52) U.S. Cl.
CPC ............. *B64F 5/10* (2017.01); *B25J 11/005* (2013.01); *B64C 3/182* (2013.01); *B64C 3/26* (2013.01)

(58) Field of Classification Search
CPC .... B64F 5/10; B64C 3/182; B64C 3/26; B25J 11/005
See application file for complete search history.

(56) References Cited

U.S. PATENT DOCUMENTS

| 4,894,903 A * | 1/1990 | Woods ................... B25B 11/00 269/131 |
| 4,945,488 A * | 7/1990 | Carver .................. B29C 64/386 700/182 |
| 4,995,146 A * | 2/1991 | Woods ................... B25B 5/003 269/45 |
| 5,033,178 A * | 7/1991 | Woods ................... B25B 11/00 29/243.57 |
| 5,046,688 A * | 9/1991 | Woods ............... B23K 37/0443 244/123.1 |

(Continued)

FOREIGN PATENT DOCUMENTS

DE        102008041190 B4    10/2013

OTHER PUBLICATIONS

Extended European Search Report for corresponding EP Application No. 19182659.3-1010 dated Oct. 16, 2019 (12 pages).

(Continued)

*Primary Examiner* — Christopher M Koehler
(74) *Attorney, Agent, or Firm* — The Small Patent Law Group LLC; Jay J. Hoette

(57) ABSTRACT

A wing panel assembly system includes a wing build station, a stringer staging station, and an overhead gantry subsystem including stringer lifting assemblies having lifting mechanisms and end effectors. The end effector has a stringer holder engaging and holding a stringer. The end effector has an actuator operable to move the stringer holder in at least one direction relative to the lifting mechanism. Each stringer lifting assembly is configured to move the stringer from the stringer staging station to the wing build station located relative to a surface of a skin of the wing panel to place the stringer onto the skin of the wing panel in a determined location.

21 Claims, 5 Drawing Sheets

(56) References Cited

U.S. PATENT DOCUMENTS

| | | | | |
|---|---|---|---|---|
| 5,341,556 A * | 8/1994 | Shubin | B64C 3/26 29/448 |
| 5,359,542 A * | 10/1994 | Pahmeier | B25J 9/1615 356/621 |
| 5,423,396 A * | 6/1995 | Fahrion | B66F 11/04 182/115 |
| 5,701,651 A * | 12/1997 | Groves | B23Q 1/623 269/37 |
| 6,170,157 B1 * | 1/2001 | Munk | B23P 21/00 244/123.1 |
| 2002/0073535 A1 * | 6/2002 | Radowick | B23Q 3/186 29/720 |
| 2002/0148271 A1 * | 10/2002 | Schiavi | B23Q 1/012 72/340 |
| 2003/0207742 A1 * | 11/2003 | Hazlehurst | B21C 51/005 483/36 |
| 2004/0093731 A1 * | 5/2004 | Sarh | B21J 15/10 29/897.3 |
| 2005/0116105 A1 * | 6/2005 | Munk | B64F 5/10 244/123.8 |
| 2010/0038024 A1 * | 2/2010 | Brandt | B64F 5/10 156/249 |
| 2014/0115850 A1 | 5/2014 | Gamboa | |
| 2015/0314889 A1 * | 11/2015 | Day | B23B 41/00 408/1 R |
| 2016/0207202 A1 * | 7/2016 | Lee | B25J 15/0491 |
| 2016/0244185 A1 | 8/2016 | Pham et al. | |
| 2016/0251091 A1 | 9/2016 | Rotter et al. | |
| 2016/0340016 A1 * | 11/2016 | Bry | B64C 1/069 |
| 2017/0144779 A1 | 5/2017 | Sisco et al. | |
| 2019/0265327 A1 * | 8/2019 | Bennison | G01S 17/86 |
| 2019/0389083 A1 * | 12/2019 | Bartlett | B25J 19/0075 |

OTHER PUBLICATIONS

SCHUNK "Superior Clamping and Gripping" Nov. 27, 2017 (96 pages).

* cited by examiner

WING PANEL ASSEMBLY SYSTEM AND METHOD

BACKGROUND

The subject matter herein relates generally to a wing panel assembly system and method.

In order to manufacture a wing panel for an aircraft, a wing skin is provided and a plurality of stringers are secured to the wing skin. Locating and placing the stringers on the wing skin was traditionally done manually, which was time-consuming and required many man-hours. Some known manufacturing systems have utilized fixtures or jigs to hold and locate the stringers. However, the fixtures or jigs are specific to one particular wing skin design. Additionally, there may be practical limits to the sizes of the fixtures or jigs.

A need remains for a system and method for assembling wing panels in a cost effective and reliable manner.

BRIEF DESCRIPTION

In one example, a wing panel assembly system is provided including a wing build station configured to hold a wing panel, a stringer staging station configured to hold a stringer, and an overhead gantry sub-system including a bridge movable above the wing build station and the stringer staging station. The overhead gantry sub-system includes a plurality of stringer lifting assemblies coupled to, and movable with, the bridge. Each stringer lifting assembly includes a lifting mechanism and an end effector coupled to the lifting mechanism. The lifting mechanism moves the end effector in a vertical direction along a vertical axis. The end effector has a stringer holder configured to engage and hold the stringer. The stringer holder is configured to lift, move and release the stringer. The end effector has an actuator operable to move the stringer holder in at least one direction relative to the lifting mechanism. Each stringer holder engages the stringer from above. Each stringer lifting assembly is configured to move the stringer from the stringer staging station to the wing build station located relative to a surface of a skin of the wing panel to place the stringer onto the skin of the wing panel in a determined location.

In another example, a wing panel assembly system is provided including a wing build station configured to hold a wing panel, a stringer staging station configured to hold a stringer, an overhead gantry sub-system including a bridge movable above the wing build station and the stringer staging station, and a guidance system having a guidance controller and a wing build station position locator at the wing build station. The overhead gantry sub-system includes a plurality of stringer lifting assemblies coupled to, and movable with, the bridge. Each stringer lifting assembly including a lifting mechanism and an end effector coupled to the lifting mechanism. The lifting mechanism moves the end effector in a vertical direction along a vertical axis. The end effector has a stringer holder configured to engage and hold the stringer. The stringer holder is configured to lift, move and release the stringer. The end effector has an actuator operable to move the stringer holder in at least one direction relative to the lifting mechanism. The end effector has an end effector position locator. The wing build station position locator is configured to locate a position of each end effector position locator. Each stringer holder engages the stringer from above. Each stringer lifting assembly is configured to move the stringer from the stringer staging station to an initial stringer position at the wing build station located at an initial stringer position relative to a surface of a skin of the wing panel. The wing build station position locator locates each of the end effector position locators to determine positioning of the end effectors relative to the surface of the skin of the wing panel in the initial stringer position. The guidance controller determines a movement sub-routine based on the initial stringer positions of the end effector position locators determined by the wing build station position locator to move the stringer for final placement on the surface of the skin of the wing panel in a final stringer position different from the initial stringer position.

In another example, a method is provided of assembling wing panels for an aircraft using an overhead gantry sub-system having a plurality of stringer lifting assemblies arranged along a movable bridge, wherein each stringer lifting assembly includes an end effector at an end of a lifting mechanism. The method includes coupling the end effectors of the plurality of stringer lifting assemblies to a stringer in a stringer staging station along a length of the stringer, lifting the stringer with the end effectors by operating the corresponding lifting mechanisms, moving the stringer from the stringer staging station to a wing build station by moving the bridge of the overhead gantry sub-system to a different position directly over a skin of a wing panel, lowering the stringer onto a surface of the skin of the wing panel, and releasing the stringer from the end effectors.

DETAILED DESCRIPTION

Figure 1:
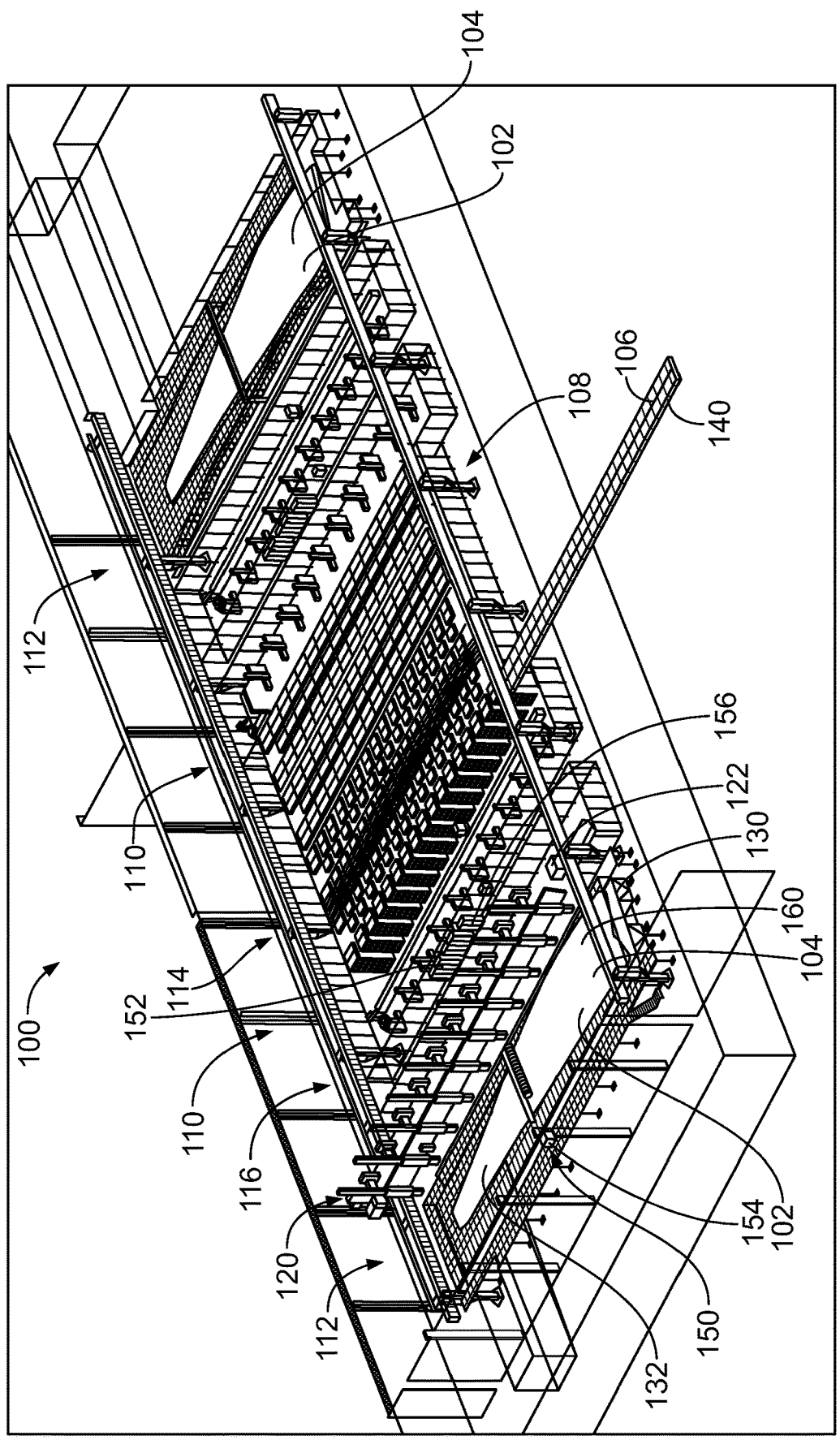
FIG. 1 is a perspective view of a wing panel assembly system in accordance with an example used to assemble wing panels of an aircraft.
Figure 2:
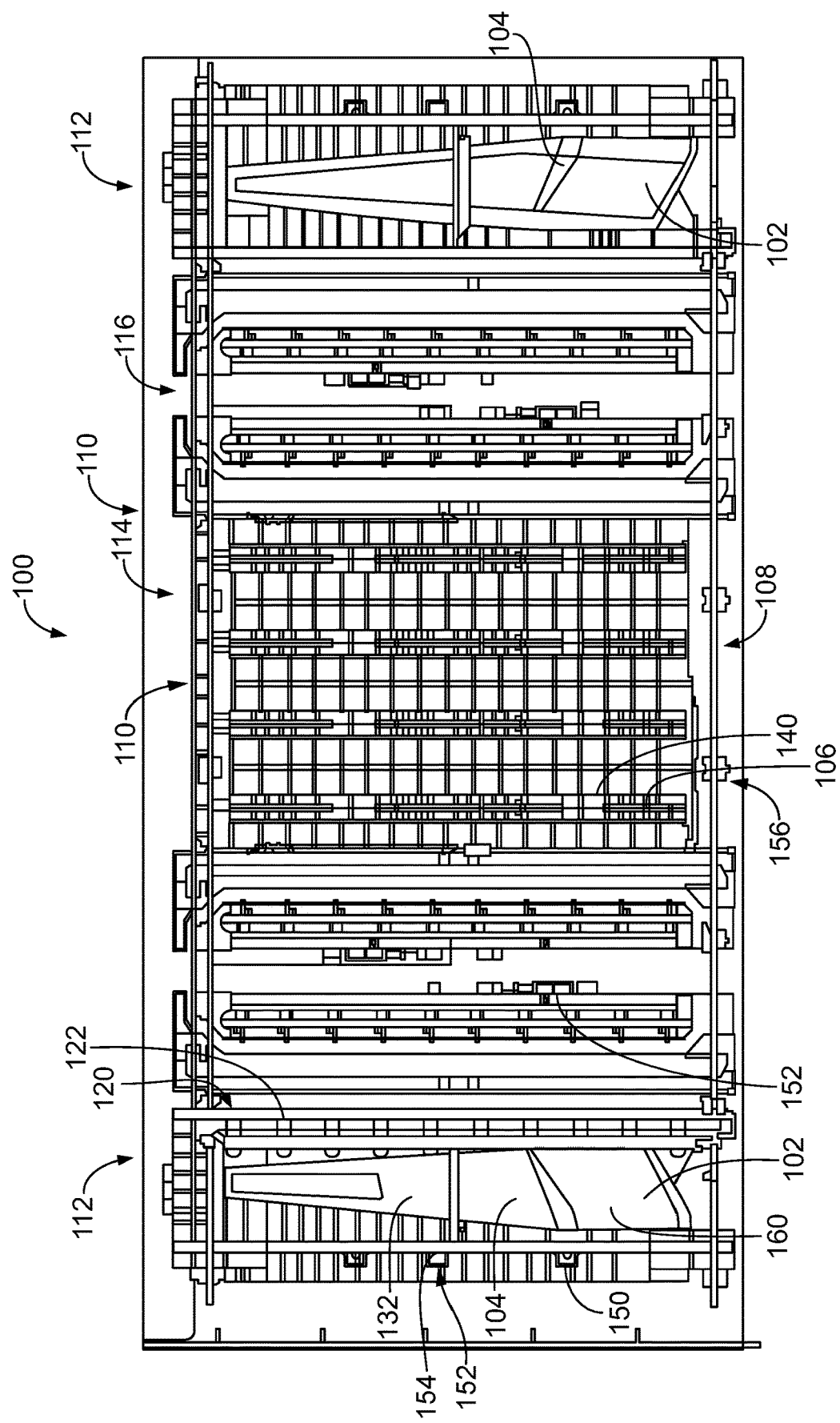
FIG. 2 is a top view of the wing panel assembly system in accordance with an example.

FIG. 1 is a perspective view of a wing panel assembly system 100 in accordance with an example used to assemble wing panels 102 of an aircraft. FIG. 2 is a top view of the wing panel assembly system 100 in accordance with an example. The wing panel assembly system 100 includes a plurality of sequential operational stations with different manufacturing operations being performed within each station. The stations are arranged in sequence such that components of the wing panel 102, such as a skin 104, a stringer 106, and the like, move between the stations to allow the wing panel 102 to be fabricated. Optionally, wing panels 102 may be manufactured at both sides, such as to manufacture an upper wing panel and a lower wing panel at the same time, which may then be assembled to form a wing box for the aircraft. In an example, the components are generally moved through the assembly process, such as from station to station by an automated material transport system, such as an overhead gantry sub-system to limit human involvement. The automated material transport system allows positioning of the components for automated processing.

The wing panel assembly system 100 includes a stringer staging station 110 and a wing build station 112 in a work floor 108 of a manufacturing facility. The stringer staging station 110 includes an inventory management station 114 and one or more processing stations 116. The wing panel assembly system 100 may include other stations in other various examples. Each station may include various sub-stations therein. The wing panel assembly system 100 includes an overhead gantry sub-system 120 used to transport components between the stations. The overhead gantry sub-system 120 includes a bridge 122 movable above the wing build station 112 and the stringer staging station 110 to move the stringer 106 from the stringer staging station 110 to the wing build station 112.

The skin 104 is provided on a support 130, such as a layup mandrel in the wing build station 112. In an example, the skin 104 is oriented generally horizontally within the wing build station 112 on top of the support 130. The skin 104 generally has a predetermined contour or profile corresponding to the shape of the wing panel 102. The skin 104 has a surface 132 configured to receive the stringers 106. In various examples, the skin 104 is uncured and the stringers 106 are configured to be bonded to the skin 104 at the wing build station 112. In other various examples, the skin 104 is cured and the stringers 106 are configured to be bonded to the skin 104 at the wing build station 112.

The stringers 106 are initially held on stringer carts 140 that are movable into and out of the inventory management station 114. The inventory management station 114 may hold multiple stringer carts 140 having various types of stringers 106. The stringers 106 may be stored and/or transported on the stringer carts 140. Optionally, each stringer cart 140 may hold a single stringer 106. In other various examples, each stringer cart 140 may hold multiple stringers 106. The stringer 106 is held on the stringer cart 140 in a predetermined contour or profile corresponding to the contour of the skin 104.

During assembly, the overhead gantry sub-system 120 moves individual stringers 106 from the inventory management station 114 to the processing station 116 for processing. In various examples, the processing station 116 may include one or more plasma robots for plasma etching the stringer 106 prior to moving the stringer 106 to the wing build station 112. In various examples, the processing station 116 may include one or more cap edge treatment robots for applying a cap edge treatment to the stringer 106 prior to moving the stringer 106 to the wing build station 112. In various examples, the processing station 116 may include an adhesive application robot for applying adhesive to the stringer 106 prior to moving the stringer 106 to the wing build station 112. The processing station 116 may perform other processes in other various examples to prepare the stringer 106 prior to transporting the stringer 106 to the wing build station 112. In various examples, the overhead gantry sub-system 120 may move the stringers 106 between the various processing substations within the processing station 116, such as to different areas within the processing station 116 for processing by different robots for different processes. In other various examples, the stringer 106 may remain at the same location for processing by different robots such that the overhead gantry sub-system 120 does not move the stringer 106 within the processing station 116, but rather only moves the stringer 106 into the processing station 116 for processing and then moves the stringer 106 out of the processing station 116 to the wing build station 112.

In an example, the wing panel assembly system 100 includes a guidance system 150 having a guidance controller 152 operably coupled to the overhead gantry sub-system 120 to control operation of the overhead gantry sub-system 120.

The guidance system 150 includes a wing build station position locator 154 at the wing build station 112 and a stringer staging station position locator 156 at the stringer staging station 110. The wing build station position locator 154 is configured to locate the position of the overhead gantry sub-system 120 within the wing build station 112 (a sensed position) to position the stringer 106 relative to the surface 132 of the skin 104 of the wing panel 102 and the wing build station 112. In an example, the wing build station position locator 154 is used to accurately locate the position of the skin 104 within the wing build station 112 (a sensed position) to thus determine the relative position of the overhead gantry sub-system 120 within the wing build station 112. For example, skin position locators 160 may be coupled to the skin 104 at a plurality of locations to determine the location of the surface 132 of the skin 104 and compared to the location of the overhead gantry sub-system 120 for positioning the stringer 106 on the surface 132 of the skin 104.

The stringer staging station position locator 156 is configured to locate a position of the overhead gantry sub-system 120 within the stringer staging station 110 (a sensed position), such as to pick up the stringer 106 from the inventory management station 114, to move the stringer 106, to place the stringer 106 in the processing station 116, to pick up the stringer 106 from the processing station 116, and the like. The wing build station position locator 154 and the stringer staging station position locator 156 provide feedback to the guidance controller 152 to provide on-the-fly position information to the guidance controller for programmable, updatable guidance of the overhead gantry sub-system 120. In an example, the guidance system 150 uses vision guidance for accurate positioning of the overhead gantry sub-system 120 within the wing panel assembly system 100. For example, in various examples, the wing build station position locator 154 and the stringer staging station position locator 156 are laser positioners (may be referred to hereinafter as wing build station laser positioner 154 or string staging station laser positioner 156) that use lasers to determine accurate, multiple sensed positions of the overhead gantry sub-system 120 for position control of the overhead gantry sub-system 120.

Figure 3:
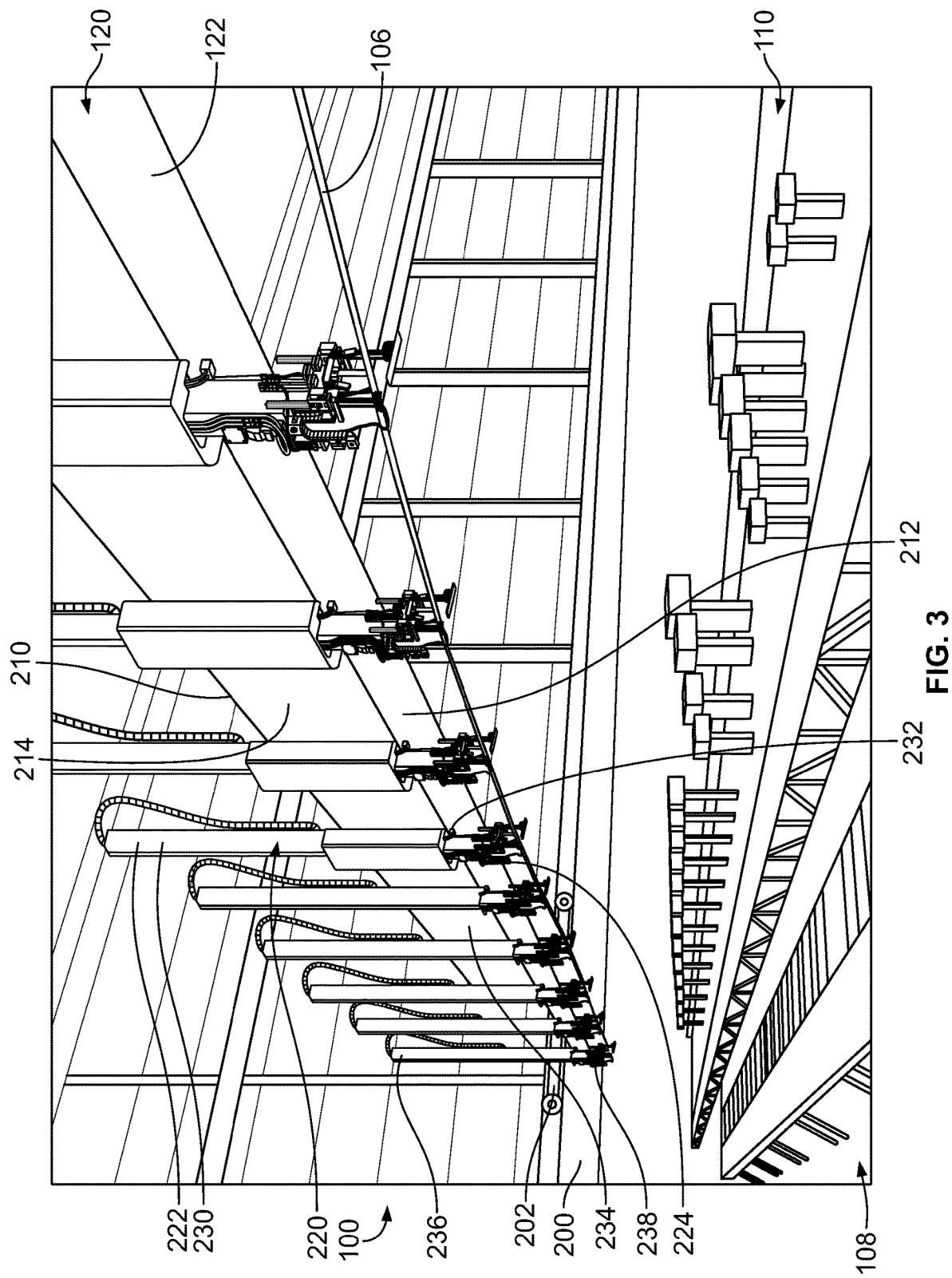
FIG. 3 is a perspective view of the wing panel assembly system showing a portion of the overhead gantry sub-system in accordance with an example.

FIG. 3 is a perspective view of the wing panel assembly system 100 showing a portion of the overhead gantry sub-system 120 in accordance with an example. The overhead gantry sub-system 120 includes the bridge 122 movable along a runway beam 200 extending the length of the work floor 108 along the stringer staging station 110 and the wing build station 112 (shown in FIGS. 1 and 2).

In an example, the bridge 122 is coupled to the runway beam 200 by a rolling carriage 202. Optionally, carriages 202 and runway beams 200 may be provided at opposite ends of the bridge 122. The carriage 202 moves the bridge 122 along the runway beam 200 to change the position of the bridge 122 over the work floor 108. For example, the bridge 122 may be moved between the various stations using the carriage 202. In various examples, the rolling carriage 202 rolls along the runway beam 200. The bridge 122 may be coupled to the runway beam 200 by other means in alternative examples or may be movable between the various stations by other means in alternative examples.

The bridge 122 includes a top 210 and a bottom 212. The bridge 122 includes a front side 214 extending between the top 210 and the bottom 212. The front side 214 extends lengthwise between opposite ends of the bridge 122. In various examples, the bridge 122 includes one or more metal beams. The bridge 122 remains elevated overhead above the stations and moves the components, such as the stringers 106, between the various stations.

In an example, the overhead gantry sub-system 120 includes a plurality of stringer lifting assemblies 220 coupled to, and movable with, the bridge 122. Each stringer lifting assembly 220 includes a lifting mechanism 222 and an end effector 224 coupled to the lifting mechanism 222. The lifting mechanism 222 is coupled to the front side 214 of the bridge 122. The lifting mechanism 222 moves the end effector 224 in a vertical direction along a vertical axis toward and away from the stringer 106 (when the end effector 224 is not holding the stringer 106) and/or to lift and lower the stringer 106 (when the end effector 224 is holding the stringer 106). In various examples, the lifting mechanisms 222 are pogos, also known as pogo lifts. In an example, each lifting mechanism 222 is operable independently. Each lifting mechanism 222 is operable to a different depth, at a different rate, at a different time, and the like. For example, because the stringer 106 may be contoured, some of the lifting mechanisms 222 may be operated to depths further from the bottom 212 while other lifting mechanisms 222 may be operated to depths closer to the bottom 212.

In an example, the lifting mechanism 222 includes a rail 230 and a coupling 232. The rail 230 is slidable in the vertical direction within the coupling 232. The coupling 232 may be covered by a sleeve or other cover. The lifting mechanism 222 includes a lifting mechanism positioner 234 operably coupled to the rail 230 to position the rail 230 in the coupling 232. The lifting mechanism positioner 234 may include an electric motor, a pneumatic pump, a hydraulic pump, or another type of actuator to move the rail 230. The lifting mechanism positioner 234 may include a drive screw, a gear, a rack and pinion, a piston, or another mechanism for positioning the rail 230 within the coupling 232. The rail 230 extends between a top 236 and a bottom 238. The end effector 224 is provided at the bottom 238 of the rail 230. The rail 230 positions the end effector 224, such as for engaging, lifting, or placing the stringer 106.

In various examples, the couplings 232 may be movable along the front side 214 of the bridge 122 to change the positions of the lifting mechanisms 222. For example, the lifting mechanisms 222 may be moved relatively closer together or further apart, such as to accommodate longer or shorter stringers 106. In various examples, the couplings 232 may be provided on rolling carriages coupled to the bridge 122 and slidable along the bridge 122. In alternative examples, the couplings 232 may be fixed to the bridge 122.

Figure 4:
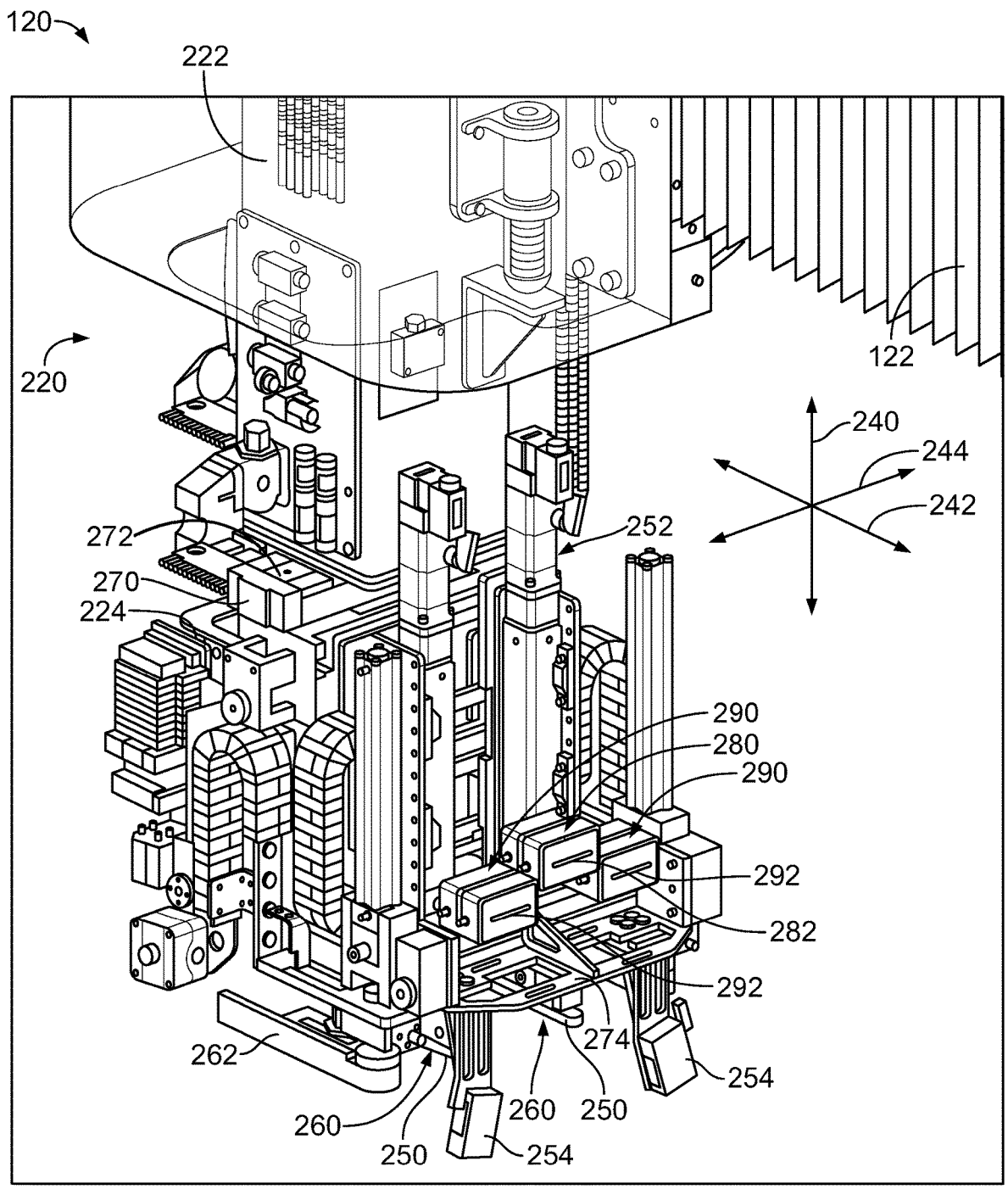
FIG. 4 is a perspective view of a portion of the overhead gantry sub-system showing the end effector provided at the end of the lifting mechanism in accordance with an example.

FIG. 4 is a perspective view of a portion of the overhead gantry sub-system 120 showing the end effector 224 provided at the end of the lifting mechanism 222 in accordance with an example. The end effector 224 is movable in a vertical direction 240 with the lifting mechanism 222. The end effector 224 includes a stringer holder 250 configured to engage and hold the stringer 106 (shown in FIG. 3), an actuator 252 for moving the end effector 224 and an end effector position locator 254 for locating the position of the end effector 224.

The stringer holder 250 is used to lift, move and release the stringer 106 as the overhead gantry sub-system 120 is operated. In the illustrated example, the stringer holder 250 includes a vacuum holder 260 configured to hold the stringer 106 by vacuum pressure. Other types of stringer holders may be used in alternative examples, such as gripping fingers, edge indexes, end gates, suction cups, clips, and the like. The stringer holder 250 is moved into contact with the stringer 106 to engage and lift the stringer 106 and move the stringer 106 between the various stations. The stringer holder 250 may release the stringer 106, such as in the processing station 116 or in the wing build station 112 (shown in FIGS. 1 and 2). In an example, the end effector 224 includes a gate 262 below the stringer holder 250. The gate 262 is used for safety in case the stringer holder 250 accidentally releases the stringer 106. The gate 262 may catch the stringer 106 to protect workers or equipment below and to prevent damage to the stringer 106.

The actuator 252 is operable to move the stringer holder 250 in at least one direction relative to the lifting mechanism 222. In an example, the actuator 252 includes a lateral positioner 270 operable to move the stringer holder 250 in a lateral direction 242 perpendicular to the vertical direction 240. In the illustrated example, the lateral positioner 270 includes an electric motor 272 for driving a driveshaft or gear to move the stringer holder 250 in the lateral direction 242. For example, the stringer holder 250 may be mounted to a bracket 274 movable by the lateral positioner 270. Other types of devices may be used in alternative examples to move the stringer holder 250 in the lateral direction 242. For example, the lateral positioner may include a hydraulic actuator, a pneumatic actuator, or another type of device.

In an example, the actuator 252 includes a transverse positioner 280 operable to move the stringer holder 250 in a transverse direction 244 perpendicular to the vertical direction 240 and the lateral direction 242. The transverse direction may be parallel to the bridge movement direction (for example, of the carriage 202 along the runway beam 200 shown in FIG. 3). In the illustrated example, the transverse positioner 280 includes an electric motor 282 for driving a driveshaft or gear to move the stringer holder 250 in the lateral direction 242. For example, the transverse positioner 280 may move the bracket 274. Other types of devices may be used in alternative examples to move the stringer holder 250 in the transverse direction 244. For example, the transverse positioner may include a hydraulic actuator, a pneumatic actuator, or another type of device.

In an example, the actuator 252 includes a vertical positioner 290 operable to move the stringer holder 250 in the vertical direction 240. In the illustrated example, the vertical positioner 290 includes an electric motor 292 for driving a driveshaft or gear to move the stringer holder 250 in the vertical direction 240. For example, the vertical positioner 290 may move the bracket 274. Other types of devices may be used in alternative examples to move the stringer holder 250 in the vertical direction 240. For example, the vertical positioner may include a hydraulic actuator, a pneumatic actuator, or another type of device.

In one particular example, the actuator 252 only includes the lateral positioner 270 and does not include any additional transverse positioner 280 or vertical positioner 290. The lifting mechanism 222 is used for moving the stringer holder 250 in the vertical direction 240, the lateral positioner 270 is used for moving the stringer holder 250 in the lateral direction 242 and the bridge 122 is used for moving the stringer holder 250 in the transverse direction 244.

In another particular example, such as in the illustrated example, the actuator 252 includes the lateral positioner 270, the transverse positioner 280 and the vertical positioner 290. The bridge 122 is used for coarse positioning of the stringer lifting assembly 220 over the stringer 106. The lifting mechanism 222 is operated for coarse positioning of the end effector 224 over the stringer 106 in the vertical direction 240. For example, the lifting mechanism 222 positions the end effector 224 such that the stringer holder 250 hovers immediately above the stringer 106. The actuator 252 is then used for fine positioning of the stringer holder 250 to engage the stringer 106. For example, the lateral positioner 270 may move the stringer holder 250 in the lateral direction 242, the transverse positioner 280 may move the stringer holder 250 in the transverse direction 244 and the vertical positioner 290 may move the stringer holder 250 in the vertical direction 240 to engage the stringer 106. The guidance system 150 may be used to control the movements of the actuator 252.

The end effector position locator 254 is movable with the end effector 224. The end effector position locator 254 is used by the guidance system 150 (shown in FIGS. 1 and 2) to determine the sensed position of the end effector 224 in three-dimensional space for controlling operation of the overhead gantry sub-system 120. In an example, the end effector 224 includes a plurality of end effector position locators 254 coupled to the end effector 224. As such, the end effector position locators 254 may be used to triangulate the position of the end effector 224 in three-dimensional space. Optionally, the end effector position locators 254 may be positioned in proximity to the stringer holder 250 and thus in close proximity to the stringer 106. The end effector position locators 254 may be positioned at known or calibrated positions relative to the stringer holder 250 such that the guidance system 150 is capable of determining the position of the stringer 106 held by the end effector 224.

In various examples, the end effector position locators 254 are coupled to the bracket 274 and movable with the bracket 274. Additionally or alternatively, the end effector position locator 254 may be coupled to the lifting mechanism 222. Optionally, when end effector position locators 254 are coupled to both the bracket 274 and the lifting mechanism 222 the guidance system 150 is able to determine the operational positions of the lateral positioner 270, the transverse positioner 280, and the vertical positioner 290 by comparing relative positions of the end effector position locator 254 on the lifting mechanism 222 to the position of the end effector position locators 254 mounted to the bracket 274.

The end effector position locators 254 are sensors configured to be operably coupled to the wing build station position locator 154 and/or the stringer staging station position locator 156 (shown in FIGS. 1 and 2). In an example, the wing build station position locator 154 and/or the stringer staging station position locator 156 are optically coupled to the end effector position locators 254. For example, the end effector position locators 254 are retro reflectors configured to reflect light, such as laser light from the wing build station position locator 154 (for example, the wing build station laser positioner 154) and/or the stringer staging station position locator 156 (for example, the stringer staging station laser positioner 156). However, other types of sensors may be used in alternative examples. For example, the end effector position locators 254 may be proximity sensors, global positioning sensors, or other types of position sensors. The wing build station position locator 154 and/or the stringer staging station position locator 156 may be communicatively coupled to the end effector position locators 254, such as by radio frequency signals or other wireless communication signals. In various examples, the end effector position locators 254 may provide vision guidance for positioning the end effector 224 and/or the stringer holder 250 within the work space. Optionally, the end effector position locators 254 may include cameras providing images of the stringer holder 250 and/or the stringer 106 and/or the skin 104 of the wing panel 102 and/or the station in which the overhead gantry sub-system 120 is operating.

Figure 5:
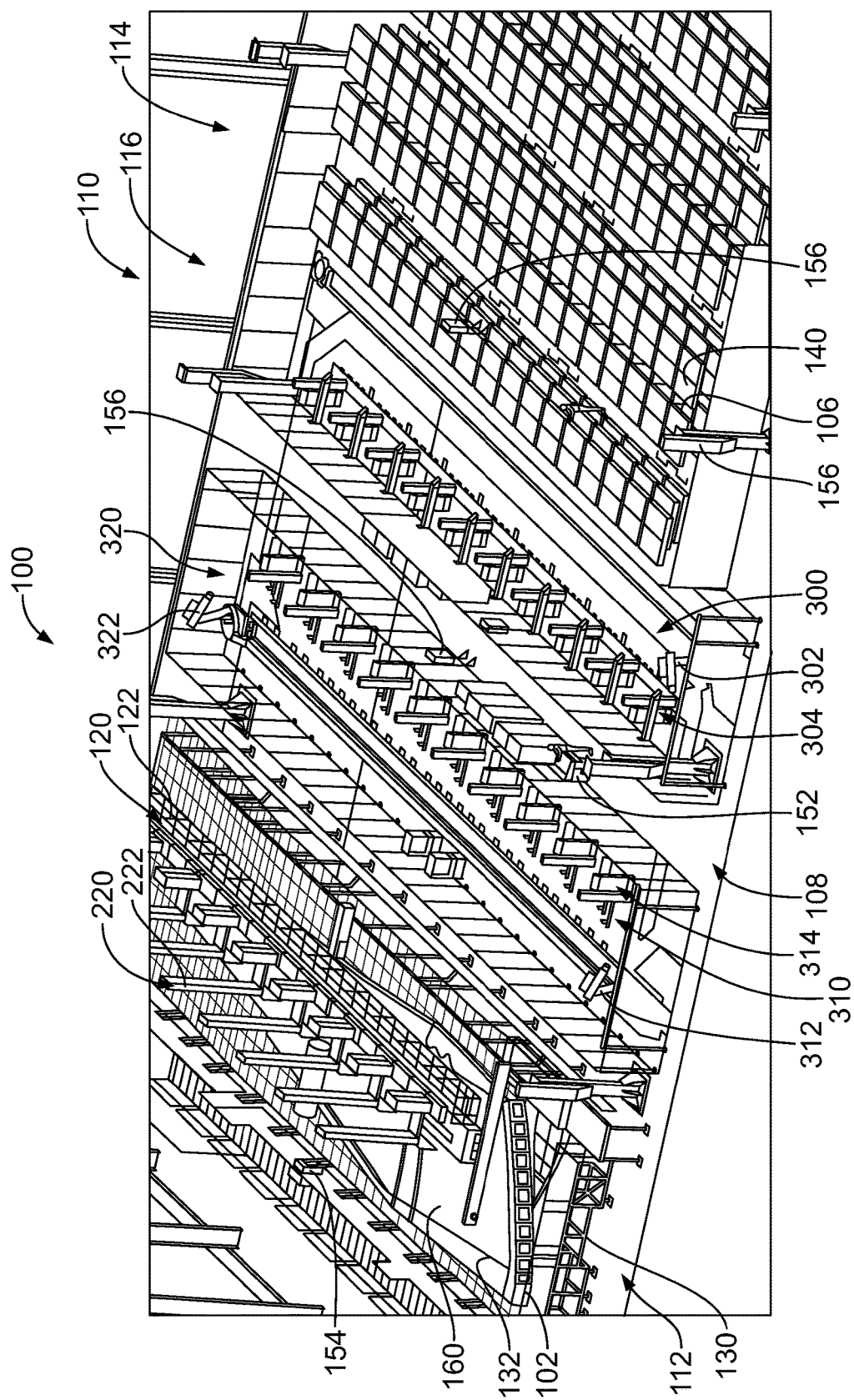
FIG. 5 is a perspective view of a portion of the wing panel assembly system in accordance with an example.

FIG. 5 is a perspective view of a portion of the wing panel assembly system 100 in accordance with an example. During assembly, the skin 104 of the wing panel 102 is positioned in the wing build station 112 on the support 130. The overhead gantry sub-system 120 is operated to move the bridge 122 to the inventory management station 114 of the stringer staging station 110 to pick up one of the stringers 106 from the corresponding stringer cart 140. In an example, the guidance system 150 is used to position the overhead gantry sub-system 120 relative to the stringer 106 to pick up the stringer 106 in the inventory management station 114. For example, the stringer staging station position locator 156 is used to position the end effectors 224 of each of the stringer lifting assemblies 220 relative to the stringer 106 to engage and lift the stringer 106.

The overhead gantry sub-system 120 is operated to cause the stringer lifting assemblies 220 to lift the stringer 106 off of the stringer cart 140. For example, the lifting mechanisms 222 position the end effectors 224 over the stringer 106 and the end effectors 224 are coupled to the stringer 106. The stringer lifting assemblies 220 are arranged along the length of the stringer 106 to lift the stringer 106. The stringer holders 250 of the end effectors 224 engage and lift the stringers 106 from the stringer cart 140. The lifting mechanisms 222 may be raised vertically upward and the bridge 122 may be moved transversely along the work floor 108 to a different station, such as the processing station 116.

In an example, the processing station 116 includes a plasma etching processing substation 300. The plasma etching processing substation 300 includes one or more plasma robots 302 for plasma etching the stringer 106 prior to moving the stringer 106 to the wing build station 112. The overhead gantry sub-system 120 is configured to move the stringer 106 from the inventory management station 114 or another station to the plasma etching processing substation 300. In various examples, the overhead gantry sub-system 120 may hold the stringer 106 in the plasma etching processing substation 300. In alternative examples, the overhead gantry sub-system 120 may release the stringer 106 in the plasma etching processing substation 300, such as on a stringer fixture 304. The stringer fixture 304 holds the stringer 106 and may be configured to manipulate, such as roll over, the stringer 106 on the stringer fixture 304. The overhead gantry sub-system 120 is configured to move the stringer 106 from the plasma etching processing substation 300.

In an example, the processing station 116 includes a cap edge treatment processing substation 310. The cap edge treatment processing substation 310 includes one or more cap edge treatment robots 312 for applying a cap edge treatment to the stringer 106 prior to moving the stringer 106 to the wing build station 112. The overhead gantry sub-system 120 is configured to move the stringer 106 from the inventory management station 114 or another station to the cap edge treatment processing substation 310. In various examples, the overhead gantry sub-system 120 may hold the stringer 106 in the cap edge treatment processing substation 310. In alternative examples, the overhead gantry sub-system 120 may release the stringer 106 in the cap edge treatment processing substation 310, such as on a stringer fixture 314. The stringer fixture 314 holds the stringer 106 and may be configured to manipulate, such as roll over, the stringer 106 on the stringer fixture 314. The overhead gantry sub-system 120 is configured to move the stringer 106 from the cap edge treatment processing substation 310.

In an example, the processing station 116 includes an adhesive application processing substation 320. The adhesive application processing substation 320 includes an adhesive application robot 322 for applying adhesive to the stringer 106 prior to moving the stringer 106 to the wing build station 112. The overhead gantry sub-system 120 is configured to move the stringer 106 from the inventory management station 114 or another station to the adhesive application processing substation 320. In various examples, the overhead gantry sub-system 120 may hold the stringer 106 in the adhesive application processing substation 320. In alternative examples, the overhead gantry sub-system 120 may release the stringer 106 in the adhesive application processing substation 320. The overhead gantry sub-system 120 is configured to move the stringer 106 from the adhesive application processing substation 320.

The processing station 116 may perform other processes in other various examples to prepare the stringer 106 prior to transporting the stringer 106 to the wing build station 112. The stringer staging station position locator 156 may be used to position the end effectors 224 and/or the stringer 106 at any of the substations within the processing station 116.

The overhead gantry sub-system 120 moves the stringer 106 from the stringer staging station 110 to the wing build station 112 by moving the bridge 122 to a position directly over the skin 104 of the wing panel 102. The overhead gantry sub-system 120 lowers the stringer 106 onto the surface 132 of the skin 104 of the wing panel 102 and releases the stringer 106 from the end effectors 224. The overhead gantry sub-system 120 returns the lifting mechanisms 222 and the end effectors 224 to the stringer staging station 110 to retrieve another stringer 106 for application to the skin 104 of the wing panel 102. In an example, once all of the stringers 106 are coupled to the skin 104, the stringers 106 may be cured or otherwise bonded to the skin 104 to form the wing panel 102. In such manner, the wing panel 102 may be manufactured. In various examples, the skin 104 is an uncured wing skin and the stringers 106 are cured stringers prior to placement on the uncured wing skin 104. In other various examples, the skin 104 is cured and the stringers 106 are uncured prior to placement on the skin 104. In other various examples, both the skin 104 and the stringers 106 are uncured.

In an example, during assembly, the overhead gantry sub-system 120 initially moves the stringer 106 to an initial stringer position in the wing build station 112 in which the stringer 106 is elevated directly above the skin 104 of the wing panel 102. The stringer 106 is not in contact with the surface 132 of the skin 104. The guidance system 150 is used to verify position of the stringer 106 relative to the skin 104 prior to placement. The guidance system 150 is used to manipulate the position of the stringer 106 to a precise position relative to the skin 104 prior to lowering the stringer 106 into engagement with the surface 132 of the skin 104 of the wing panel 102. The overhead gantry sub-system 120 initially moves the stringer 106 to the course or macro initial position prior to the guidance system 150 determining the precise or micro position for the stringer 106.

In an example, the guidance system 150 uses the wing build station position locator 154 to locate the end effector position locators 254 of each of the end effectors 224. By determining the precise locations of each of the end effector position locators 254 of each of the end effectors 224, the guidance system 150 is able to determine the precise location of the stringer 106 relative to the surface 132 of the skin 104. The wing build station position locator 154 determines the location of the surface 132 of the skin 104, such as using the skin position locators 160 or images of the skin 104, such as from a camera. The guidance system 150 determines a movement sub-routine based on the sensed locations of the end effector position locators 254 of each of the end effectors 224 to move the stringer 106 from the initial stringer position to the final stringer position. The guidance controller 152 of the guidance system 150 causes each of the actuators 252 of each of the end effectors 224 to move independently according to the movement sub-routine to precisely position the stringer 106 relative to the surface 132 of the skin 104. As such, the stringer 106 may be placed on the skin 104 based on the actual presented position of the stringer 106 and the actual presented location of the skin 104 within the wing build station 112, which may be slightly different for each wing panel being assembled. For example, wing panels manufactured without feedback and final stringer positioning based on sensed locations are manufactured with greater irregularities than the wing panel 102 manufactured using the wing panel assembly system 100 using the guidance system 150 and the wing build station position locator 154.

It is to be understood that the above description is intended to be illustrative, and not restrictive. For example, the above-described examples (and/or aspects thereof) may be used in combination with each other. In addition, many modifications may be made to adapt a particular situation or material to the teachings of the disclosure without departing from its scope. Dimensions, types of materials, orientations of the various components, and the number and positions of the various components described herein are intended to define parameters of certain examples, and are by no means limiting and are merely examples. Many other examples and modifications within the spirit and scope of the claims will be apparent to those of skill in the art upon reviewing the above description. The scope of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A wing panel assembly system comprising:
a wing build station configured to hold a wing panel;
a stringer staging station configured to hold a stringer; and
an overhead gantry sub-system comprising a bridge movable above the wing build station and the stringer staging station, the overhead gantry sub-system comprising a plurality of stringer lifting assemblies coupled to, and movable with, the bridge, each stringer lifting assembly including a lifting mechanism and an end effector coupled to the lifting mechanism, the lifting mechanism including a coupling coupled to the bridge and a rail operably coupled to the coupling and movable relative to the coupling in a vertical direction, the lifting mechanism moving the end effector in a vertical direction along a vertical axis, the end effector having a stringer holder configured to engage and hold the stringer, the stringer holder configured to lift, move and release the stringer, the end effector having an actuator operable to move the stringer holder relative to the lifting mechanism, wherein the actuator includes a lateral positioner operable to move the stringer holder in a lateral direction perpendicular to the vertical direction and a transverse positioner operable to move the stringer holder in a transverse direction perpendicular to the vertical direction and the lateral direction, wherein each end effector is independently positionable by the associated lifting mechanism;

wherein each stringer holder engages the stringer from above; and wherein each stringer lifting assembly is configured to move the stringer from the stringer staging station to the wing build station located relative to a surface of a skin of the wing panel to place the stringer onto the skin of the wing panel in a determined location.

2. The wing panel assembly system of claim 1, wherein each stringer holder includes a vacuum holder configured to hold the stringer by vacuum pressure.

3. The wing panel assembly system of claim 1, wherein the actuator further includes a vertical positioner operable to move the stringer holder in the vertical direction.

4. The wing panel assembly system of claim 1, wherein the stringer staging station includes an inventory management station receiving stringer carts used for moving stringers into the inventory management station, the end effectors configured to lift the stringers off of the stringer carts to move the stringers.

5. The wing panel assembly system of claim 1, wherein the stringer staging station includes a processing station receiving the stringer for processing the stringer prior to moving the stringer to the wing build station.

6. The wing panel assembly system of claim 1, wherein each stringer lifting assembly is independently movable in at least two mutually perpendicular directions relative to each other stringer lifting assembly.

7. The wing panel assembly system of claim 1, wherein each end effector includes an end effector position locator at an exterior of the end effector and movable in space with the end effector, the end effector position locator viewable and readable by a vision guidance system controlling the overhead gantry sub-system, the end effector being programmably movable based on a sensed position of the end effector position locator.

8. The wing panel assembly system of claim 7, wherein the vision guidance system includes a guidance controller and a wing build station position locator at the wing build station, the wing build station position locator configured to locate a position of each end effector position locator to position the end effectors relative to the surface of the skin of the wing panel in the wing build station.

9. The wing panel assembly system of claim 7, wherein the vision guidance system includes a guidance controller and a stringer staging station position locator at the stringer staging station, the stringer staging station position locator configured to locate a position of each end effector position locator to position the end effectors relative to the stringer to initially engage the stringer.

10. The wing panel assembly system of claim 7, wherein the vision guidance system includes a guidance controller and a position locator operably coupled to the guidance controller, the position locator having a laser positioner, the laser positioner using lasers to determine a position of each end effector position locator to determine positions of the end effectors relative to the laser positioner, the end effectors being programmably movable based on sensed positions of the end effectors.

11. A wing panel assembly system comprising:
a wing build station configured to hold a wing panel;
a stringer staging station configured to hold a stringer;
an overhead gantry sub-system comprising a bridge movable above the wing build station and the stringer staging station, the overhead gantry sub-system comprising a plurality of stringer lifting assemblies coupled to, and movable with, the bridge, each stringer lifting assembly including a lifting mechanism and an end effector coupled to the lifting mechanism, the lifting mechanism including a coupling coupled to the bridge and a rail operably coupled to the coupling and movable relative to the coupling in a vertical direction, the lifting mechanism moving the end effector in a vertical direction along a vertical axis, the end effector having a stringer holder configured to engage and hold the stringer, the stringer holder configured to lift, move and release the stringer, the end effector having an actuator operable to move the stringer holder relative to the lifting mechanism, the actuator including a lateral positioner operable to move the stringer holder in a lateral direction perpendicular to the vertical direction and a transverse positioner operable to move the stringer holder in a transverse direction perpendicular to the vertical direction and the lateral direction, the end effector having an end effector position locator at an exterior of the end effector and movable in space with the end effector, wherein each end effector is independently positionable by the associated lifting mechanism;

and a guidance system having a guidance controller and a wing build station position locator at the wing build station, the wing build station position locator configured to locate a position of each end effector position locator using vision guidance;

wherein each stringer holder engages the stringer from above;

wherein each stringer lifting assembly is configured to move the stringer from the stringer staging station to an initial stringer position at the wing build station located at an initial stringer position relative to a surface of a skin of the wing panel;

wherein the wing build station position locator locates each of the end effector position locators to determine positioning of the end effectors relative to the surface of the skin of the wing panel in the initial stringer position; and wherein the guidance controller determines a movement sub-routine based on the initial stringer positions of the end effector position locators determined by the wing build station position locator to move the stringer for final placement on the surface of the skin of the wing panel in a final stringer position different from the initial stringer position.

12. The wing panel assembly system of claim 11, wherein the actuator of the end effector includes a vertical positioner operable to move the stringer holder in the vertical direction.

13. The wing panel assembly system of claim 11, wherein the guidance system includes a stringer staging station position locator at the stringer staging station, the stringer staging station position locator configured to locate a position of each end effector position locator to position the end effectors relative to the stringer to initially engage the stringer.

14. The wing panel assembly system of claim 11, wherein the wing build station position locator includes a laser positioner using lasers to determine a position of each end effector position locator to determine positions of the end effectors relative to the laser positioner, the end effectors being programmably movable based on sensed positions of the end effectors.

15. The wing panel assembly system of claim 11, wherein the stringer staging station includes a processing station receiving the stringer for processing the stringer prior to moving the stringer to the wing build station, the actuator positioning the end effector in the processing station.

16. The wing panel assembly system of claim 11, wherein each stringer lifting assembly is independently movable in at least two mutually perpendicular directions relative to each other stringer lifting assembly.

17. A wing panel assembly system comprising:
a wing build station configured to hold a wing panel;
a stringer staging station configured to hold a stringer;
an overhead gantry sub-system comprising a bridge movable above the wing build station and the stringer staging station, the overhead gantry sub-system comprising a plurality of stringer lifting assemblies coupled to, and movable with, the bridge, each stringer lifting assembly including a lifting mechanism and an end effector coupled to the lifting mechanism, the lifting mechanism moving the end effector in a vertical direction along a vertical axis, wherein each end effector is independently positionable by the associated lifting mechanism, the end effector having a stringer holder configured to engage and hold the stringer, the stringer holder configured to lift, move and release the stringer, the end effector having an actuator operable to move the stringer holder relative to the lifting mechanism, the actuator including a vertical positioner operable to move the stringer holder in the vertical direction, the actuator including a lateral positioner operable to move the stringer holder in a lateral direction perpendicular to the vertical direction, the actuator including a transverse positioner operable to move the stringer holder in a transverse direction perpendicular to the vertical direction and the lateral direction, wherein each end effector includes an end effector position locator at an exterior of the end effector and movable in space with the end effector; and
a guidance system having a guidance controller and a position locator operably coupled to the guidance controller, the position locator having a laser positioner using lasers to determine a position of each end effector position locator to determine positions of the end effectors relative to the laser positioner, the end effectors being programmably movable based on sensed positions of the end effectors;
wherein each stringer holder engages the stringer from above; and
wherein each stringer lifting assembly is configured to move the stringer from the stringer staging station to the wing build station located relative to a surface of a skin of the wing panel to place the stringer onto the surface of the skin of the wing panel in a determined location.

18. The wing panel assembly system of claim 17, wherein the guidance system includes a wing build station position locator at the wing build station configured to locate a position of each end effector position locator to position the end effectors relative to the surface of the skin of the wing panel in the wing build station.

19. The wing panel assembly system of claim 17, wherein the guidance system includes a stringer staging station position locator at the stringer staging station, the stringer staging station position locator configured to locate a position of each end effector position locator to position the end effectors relative to the stringer to initially engage the stringer.

20. The wing panel assembly system of claim 17, wherein the actuator of the end effector includes a lateral positioner operable to move the stringer holder in a lateral direction perpendicular to the vertical direction, a transverse positioner operable to move the stringer holder in a transverse direction perpendicular to the vertical direction and the lateral direction, and a vertical positioner operable to move the stringer holder in the vertical direction.

21. The wing panel assembly system of claim 17, wherein the stringer staging station includes a processing station receiving the stringer for processing the stringer prior to moving the stringer to the wing build station, the actuator positioning the end effector in the processing station.

\* \* \* \* \*